W. K. PRICE.

FRUIT SIZING MACHINE.

APPLICATION FILED SEPT. 13, 1921.

Reissued Nov. 1, 1921.

15,218.

2 SHEETS—SHEET 1.

INVENTOR

William K. Price

By Kay Fitzpatrick & Brown

Attys

W. K. PRICE.

FRUIT SIZING MACHINE.

APPLICATION FILED SEPT. 13, 1921.

Reissued Nov. 1, 1921.

15,218.

2 SHEETS—SHEET 2.

INVENTOR

William K. Price

By Kay Fulton Burr

Attys

UNITED STATES PATENT OFFICE.

WILLIAM K. PRICE, OF SELAH, WASHINGTON.

FRUIT-SIZING MACHINE.

15,218. Specification of Reissued Letters Patent. Reissued Nov. 1, 1921.

Original No. 1,246,463, dated November 13, 1917, Serial No. 80,991, filed February 28, 1916. Application for reissue filed September 13, 1921. Serial No. 500,421.

*To all whom it may concern:*

Be it known that I, WILLIAM K. PRICE, a citizen of the United States, and a resident of Selah, in the county of Yakima and State of Washington, have invented a new and useful Fruit-Sizing Machine, of which the following is a specification.

My invention relates to what is commonly termed a fruit-sizing machine, although its application may be extended to the sorting of other objects to which it may be found applicable.

The object of my invention is to produce a device for sizing fruit by weight and to do this more accurately than has been done by previous designs; to simplify and reduce the number of parts required; and to reduce the space required for a given output of fruit when separated into two or more grades and the required number of sizes for each grade.

Figures 1, 3:
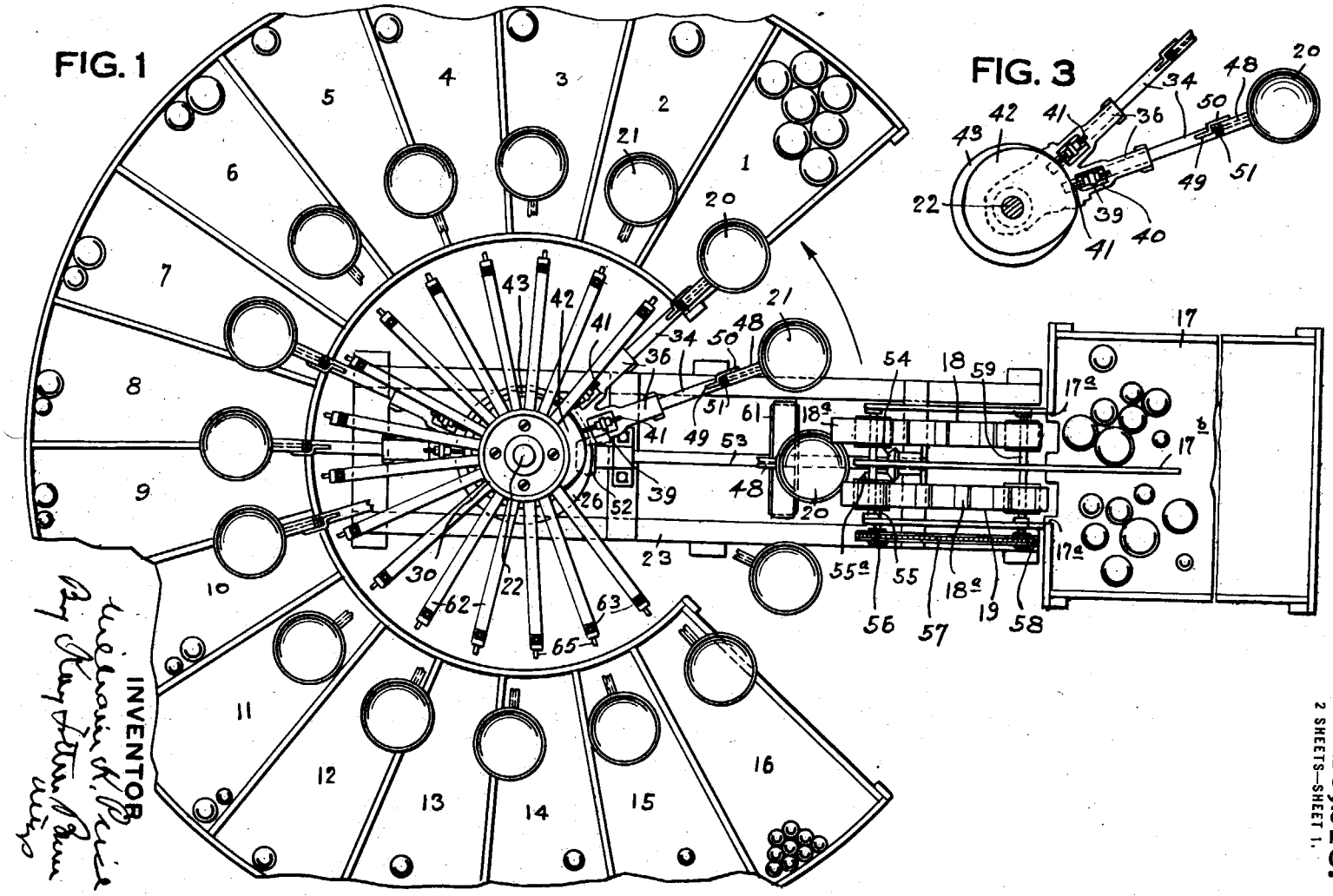
Figure 2:
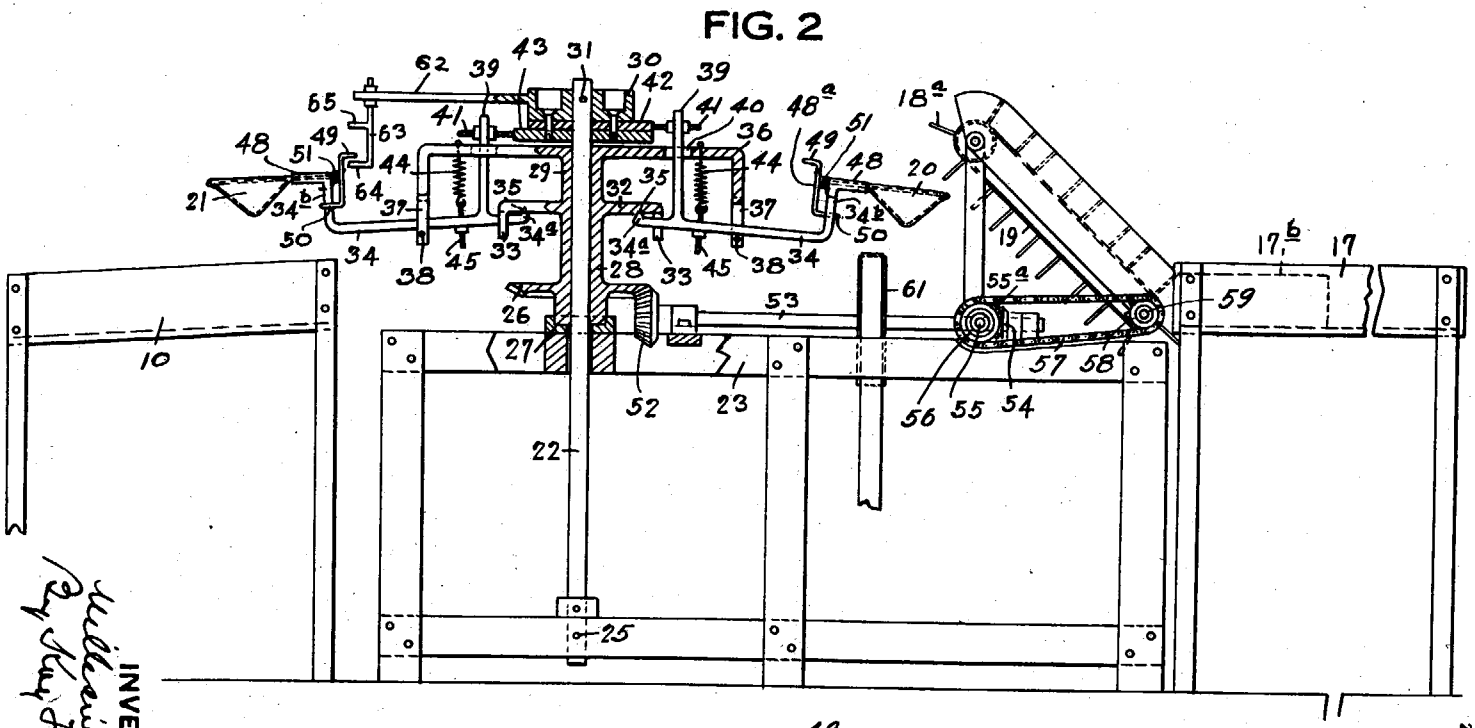
Figure 4:
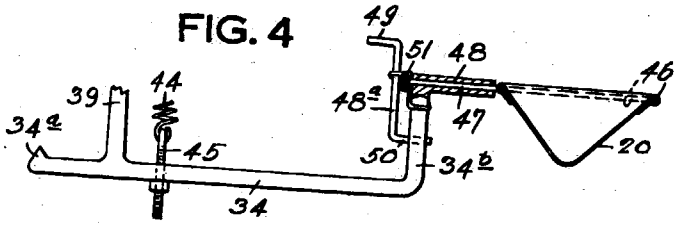

In the accompanying drawing, Figure 1 is a plan view; Fig. 2 is a vertical elevation, partly in section; Fig. 3 is a detail of the cam mechanism; and Fig. 4 is an enlarged detail.

In the drawing, the bins 1 to 16 are arranged radially to form a circular structure, and are adapted to receive the different grades of apples or other fruit to be sized.

The sorting-table 17 is provided for receiving the fruit, with the outlet $17^c$ through which the apples are fed to the conveyers or elevators 18 and 19, said elevators being separated by the partition $17^b$. The elevators comprise suitable belts with the wings $18^a$ thereon adapted to engage the apples and carry them to the top of the elevator where they are discharged into the cups 20 and 21. The supporting-frame 23 has the shaft 22 journaled therein, said shaft being non-rotary and held in position by the pin 25.

The gear 26 is mounted to rotate on the shaft 22, said gear having a bearing in the cup 27. The casting 28 connected to the gear 26 has a turning fit on the shaft 22, and the extension 29 is also adapted to turn on the shaft 22, forming part of the casting 28. The casting 30 is fixed to the shaft 22 by the pin 31.

The casting 28 is provided with radially-extending lugs 32 corresponding to the number of cups, and said lugs have forked ends 33 through which pass sixteen cup-arms 34. The cup-arms 34 have the knife-edges $34^a$ at their inner ends, which rest in grooves 35 in the lugs 32. The casting 29 has sixteen arms 36, which have forked ends 37 through which pass the cup-arms 34. Pins 38 located in the forked ends 37 of the arms 36 prevent the arms 34 from dropping entirely out of place. The cup-arm 34 is provided with the vertical arm 39, which passes through the slot 40 in the arm 36. The arm 39 carries a bolt 41, which is adjustable in said arm, and the inner end of said bolt rests against a cam 42, which is secured to the casting 30. The cups are numbered respectively 20 and 21, there being eight of each, and all the bolts 41, which are attached to arms of cup 20, bear against cam 42, while all bolts 41, which are attached to arms of cup 21, bear against cam 43.

The arms 36 each support a tension-spring 44, which are connected to an adjustable bolt 45 carried by the cup-arms 34.

The cups 20 and 21 are made of canvas or other suitable material, which is supported by the annular metal rims 46. The metal rims 46 are welded or otherwise secured to bars 47, which extend through the hollow portions 48 of the cup-arms 34, said bars 47 being provided with arms $48^a$, which carry the fingers 49 and 50. Springs 51 are coiled around the bars 47, one end of said spring engaging the arm $48^a$, and the other end of the spring engaging the vertical portion $34^b$ of the cup-arm 34. In this manner the spring 51 tends to hold the cup in receiving-position, as indicated in Figs. 2 and 4.

The finger 50 normally rests against the vertical portion $34^b$ of the cup-arm 34.

The bevel-gear 52 engages the gear 26 and rotates the castings 28 and 29 and the attached parts—lugs 32 and the arms 36. The bevel-gear 54 on the shaft 53 drives a gear $55^a$ on the shaft 55. A sprocket-wheel 56 on the shaft 55 drives the sprocket-chain 57, which drives the sprocket-wheel 58 on the shaft 59, which carries the elevator belts, which are provided with wings $18^a$ for elevating the fruit, one at a time, for each wing. The motor for driving the machine is belted to the pulley 61 on the shaft 53.

The gear and sprocket-wheel ratios are made to drive the cups so they will pass the elevator at the rate of 180 per minute. Each elevator belt drops a piece of fruit into a cup at the rate of 90 per minute; the belt 18 drops fruit into cups 20, and the belt 19 drops fruit into cups 21. The machine is so timed that the cups pass the elevator at the right moment to catch the fruit as it falls.

The cams 42 and 43 are largest at a point opposite the elevator, and they decrease in radius as the bolts 41 move around them from the elevator thus allowing the cup-arms to rise and decrease the tension on spring 44. The cam 42 begins to decrease in radius just opposite bin 1, and it is reduced to its smallest radius opposite bin 11. The cam 43 begins to decrease in radius opposite bin 6, and is reduced to its smallest radius opposite bin 16. After passing bin 16 both cams rapidly increase in radius until they reach the position for receiving the fruit in cups.

The casting 30 carries sixteen arms 62, each arm carrying a tripping-arm 63, which is adjustable vertically. The tripping-arms 63 carry both lugs 64 and 65. The tripping-arms which come opposite bins 1 to 5 carry the upper lugs 65 only; the tripping-arms which come opposite bins 6 to 11 carry both lugs 64 and 65; and the tripping-arms which come opposite bins 12 to 16 carry only the lower lugs 64.

In operation, the apples to be sized are dumped on to the sorting-table 17, and are fed to elevators 18 and 19. The apples passing up the belt 18 drop into the cups 20, while the belt 19 drops the apples into the cups 21. As stated above, all bolts 41 which are attached to arms of cup 20, bear against cam 42, and all bolts 41, which are attached to arms of cup 21, bear against cam 43. The springs 44 are adjusted to hold the bolts 41 in contact with the cams 42 and 43, but with no pressure when an apple weighing, for instance, one pound, is in the cup when the cup is leaving the elevator. The springs are further adjusted so a 2½ oz. apple will cause the bolts 41, which are connected to cups 20 to separate from the cam 42 at the bin 11, and will cause the bolts 41, which are connected to cups 21 to separate from the cams 43 at the bin 16. The radius of the cam 42 is sufficiently reduced at the bin 1 so the bolt 41 will separate from the cam 42 when the cup is carrying a one-pound apple; and the radius of the cam 43 is sufficiently reduced at bin 6 so the bolt 41 will separate from the cam 43 when the cup is carrying a one-pound apple. Apples of intermediate weights will cause a separation of bolts 41 from cams 42 and 43 at bins between 1 and 11 and between 6 and 16 in proportion to their weight.

If there are no apples in the cups, the cups move around the circle of bins from the elevator, the springs 44 holding the bolts 41 in contact with the cam 42 all the way around, which causes the cups to gradually rise until cups 20 pass bins 11 and cups 21 pass bin 16, when they fall until they reach the position for receiving the fruit.

The lugs 65 are located just high enough to miss the fingers 49 of the cups 20 when there are no apples in the cups. The lugs 65 are located successively higher so they just miss the fingers 49 as said fingers are gradually lifted up by the action of the cam 42, said lugs or trips varying in position in the same ratio as the curve of the cam varies. The lugs 64 are arranged successively higher so as to just miss the fingers 49 of the cups 21 when there are no apples in these cups. When an apple drops in a cup the strain on the spring 44 becomes greater, and at some point in the movement of the cup over the bins, the spring 44 will be unable to hold the bolt 41 in contact with the cam 43, which causes the finger 49 to stop rising, and said finger then catches against the lugs 64, which tips the cup over and drops the apple into the bin. The spring 51 acting on the bar 47 turns the cup to position for receiving another apple. The point where the bolts will leave the cam 42 for cups 20 depends upon the weight of the apple after the springs have been adjusted to drop a pound apple in bin 1 and a 2½-oz. apple in bin 11; and this is also the case with bolts 41, cam 43, and cups 21, which drop a pound apple in bin 6 and a 2½-oz. apple in bin 16.

The sizes of apples that will fall in each bin are indicated by the circles in these bins, Fig. 1. The extra fancy apples are in bins 1 to 11, and the fancy apples are in bins 6 to 16; and both the extra fancy and fancy apples are in bins 6 to 11, but they differ in size so that the packers are able to pack them in separate boxes and they mark the boxes accordingly.

The cams act as steadying members to prevent vibration of the scale-beams or cup-arm until the accurate weight is determined-at which instant the fruit or other article is dropped into the proper receiving-bin.

What I claim is:

1. A machine for sizing fruit or other articles, the combination of a rotatable frame, a receptacle for weighing the fruit, a spring from which said receptacle is suspended, means for changing the tension on said spring during the rotation of said frame, and means brought into operation by the change in tension of said spring to discharge the fruit from said receptacle.

2. In a machine for sizing fruit or other articles, the combination of a rotatable frame, a tiltable receptacle for weighing the fruit, a spring from which said receptacle is suspended, means for changing the tension on said spring during rotation of said frame, and means brought into operation by the change in tension of said spring to tilt said receptacle.

3. In a machine for sizing fruit or other articles, the combination of a rotatable frame, a receptacle for weighing the fruit, a spring from which said receptacle is suspended, and a receptacle discharging means in the path of movement of said receptacle as said frame rotates.

4. In a machine for sizing fruit or other articles, the combination of a rotatable frame, a receptacle for weighing the fruit, a spring from which said receptacle is suspended, means for changing the tension on said spring during rotation, and tripping mechanism in the path of movement of said receptacle adapted to discharge the fruit therefrom.

5. In a machine for sizing fruit or other articles, the combination of a rotatable frame, a tiltable receptacle for weighing the fruit, a spring from which said receptacle is suspended, means for changing the tension on said spring during rotation and tripping mechanism in the path of movement of said receptacle adapted to discharge the fruit therefrom.

6. In a machine for sizing fruit or other articles, the combination of a rotatable frame, a receptacle for weighing the fruit, a spring from which said receptacle is suspended, a cam member engaged by said receptacle whereby the tension on said spring varies as said receptacle rotates with said frame, and means brought into operation by the change in tension of said spring to discharge said receptacle.

7. In a machine for sizing fruit or other articles, the combination of a rotatable frame, a scale beam, a receptacle carried by said scale beam, a spring from which said scale beam is suspended, means for varying the tension on said spring as said scale beam rotates, and means brought into operation by the change in tension of said spring to discharge said receptacle.

8. In a machine for sizing fruit or other articles, the combination of a rotatable frame, a spring by which a scale beam is suspended from said frame, a receptacle on said beam, a cam member in contact with which said scale beam moves during the rotation of said receptacle, and means brought into operation by the change in tension of the spring supporting said scale beam for discharging said receptacle.

9. In a machine for sizing fruit or other articles, the combination of a rotatable frame, a scale beam engaging said frame at its inner end, a receptacle at the outer end of said scale beam, a spring from which said scale beam is suspended, a cam member in contact with which said scale beam moves during the rotation of said frame, and means brought into operation by the change in tension of said spring to discharge said receptacle.

10. In a machine for sizing fruit or other articles, the combination of a rotatable frame, a scale beam engaging said frame at its inner end, a tiltable receptacle at the outer end of the said beam, a spring from which said scale beam is suspended, a cam member in contact with which said scale beam moves during the rotation of said receptacle, and means in the path of said scale beam for tilting said receptacle.

11. In a machine for sizing fruit or other articles, the combination of a rotatable frame, a scale beam engaging said frame at its inner end, a receptacle at the outer end of said scale beam, a spring from which said scale beam is suspended, means for adjusting the tension of said spring, a cam member in contact with which said scale beam moves during the rotation of said table, and means in the path of said scale beam for discharging said receptacle.

12. In a machine for sizing fruit or other articles, the combination of a rotatable frame, a scale beam engaging said frame at its inner end, a receptacle at the outer end of said scale beam, a spring from which said scale beam is suspended, a cam member, a projection on said scale beam engaging said cam member, and moving in contact therewith during the rotation of said frame, and means in the path of said scale beam for discharging said receptacle.

13. In a machine for sizing fruit or other articles, the combination of a rotatable frame, a scale beam engaging said frame at its inner end, a receptacle at the outer end of said scale beam, a spring from which said scale beam is suspended, a cam member, an adjustable projection carried by said scale beam engaging said cam member, and moving in contact therewith during the rotation of said frame, and means in the path of said scale beam for discharging said receptacle.

14. In a machine for sizing fruit or other articles, the combination of a rotatable frame, a scale beam engaging said frame at its inner end, a tiltable receptacle carried at the outer end of said beam, an arm connected to said receptacle, a spring normally holding said receptacle in receiving position, a spring from which said scale beam is suspended, a cam member engaged by said scale beam, and in contact with which it moves during the rotation of said table, and tripping mechanism in the path of said arm whereby said receptacle is tilted.

15. In a machine for sizing fruit or other articles, the combination of a rotatable frame, a scale beam engaging said frame at its inner end, a tiltable receptacle carried at the outer end of said beam, an arm connected to said receptacle, a spring normally holding said receptacle in receiving position, a spring from which said scale beam is suspended, a cam member engaged by said scale beam and in contact with which it moves during the rotation of said table, and tilting and tripping mechanism at various heights in the path of said arm.

16. In a machine for sizing fruit or other articles, the combination of a rotatable frame, a scale beam engaging said frame at its inner end, a tiltable receptacle at the outer end of said scale beam, a spring actuated arm connected to said receptacle, a spring from which said scale beam is suspended, a cam member engaged by said scale beam and in contact with which said scale beam moves during the rotation of said frame, and projections at different heights carried by said frame in the path of said arm for tilting said receptacle.

17. In a machine for sizing fruit or other articles, the combination of a rotary frame, a series of radially-extending arms, a series of scale beams engaging the lower faces of said arms, receptacles carried by the outer ends of said scale beams, a second series of radially-extending arms above said first-mentioned arms, springs connected to said last-named arms and to said scale beams, upwardly projecting arms on said scale beams, a pair of oppositely arranged stationary cam members, projections on said upwardly-projecting arms, one set of said scale beams engaging one cam member, the other set the other cam member, and means in the path of movement of said scale beam for discharging said receptacle.

18. In a machine for sizing fruit or other articles, the combination of a rotary frame, a series of radially-extending arms, a series of scale beams engaging the lower faces of said arms, tiltable receptacles carried by the outer ends of said scale beams, a second series of radially-extending arms above said first-mentioned arms, springs connected to said last-named arms and to said scale beams, upwardly projecting arms on said scale beams, a pair of oppositely arranged stationary cam members, projections on said upwardly-projecting arms, one set of said scale beams engaging one cam member, the other set the other cam member, a series of tripping lugs arranged at different heights adapted to trip said receptacle to discharge same.

19. In a machine for sizing fruit or other articles, the combination of a suitable frame, an oscillating-beam carrying a tiltable receptacle for weighing the article, means for balancing the beam, a cam for steadying and varying the position of the beam, a series of trips for tilting the receptacle, said trips varying in position in the same ratio as the curve of the cam varies.

WILLIAM K. PRICE.